United States Patent
Kai et al.

[11] Patent Number: 5,832,407
[45] Date of Patent: Nov. 3, 1998

[54] VEHICLE SURROUNDING MONITORING DEVICE

[75] Inventors: Koichi Kai; Masahira Akasu, both of Tokyo, Japan

[73] Assignee: Mitsubishi Denki Kabushiki Kaisha, Tokyo, Japan

[21] Appl. No.: 681,519

[22] Filed: Jul. 23, 1996

[30] Foreign Application Priority Data

Apr. 12, 1996 [JP] Japan ..................... 8-091185

[51] Int. Cl.⁶ ................ G01C 21/10; G01S 1/08; G06G 7/78
[52] U.S. Cl. .............. 701/205; 701/210; 342/71
[58] Field of Search ................ 701/200, 205, 701/209, 210, 211, 300; 342/70, 71

[56] References Cited

U.S. PATENT DOCUMENTS

| | | | |
|---|---|---|---|
| 4,158,841 | 6/1979 | Wilchner et al. | 342/70 |
| 4,165,511 | 8/1979 | Wocher et al. | 342/70 |
| 4,939,662 | 7/1990 | Nimura et al. | 701/211 |
| 5,023,617 | 6/1991 | Deering | 342/70 |
| 5,163,002 | 11/1992 | Kurami | 701/28 |
| 5,465,089 | 11/1995 | Nakatani et al. | 340/995 |
| 5,471,214 | 11/1995 | Faibish et al. | 342/70 |
| 5,479,173 | 12/1995 | Yoshioka et al. | 342/70 |
| 5,529,138 | 6/1996 | Shaw et al. | 180/169 |
| 5,745,070 | 4/1998 | Yamada | 342/70 |

FOREIGN PATENT DOCUMENTS 7-120555  7/1995  Japan .

Primary Examiner—Lissi Mojica
Attorney, Agent, or Firm—Sughrue, Mion, Zinn, Macpeak & Seas, PLLC

[57] ABSTRACT

A vehicle surrounding monitoring device including: a monitoring device for detecting objects present at a surrounding of a vehicle and outputting positions of the objects defined by a predetermined detection coordinate system; a coordinates transforming device having a calculation coordinate system in which a position of the monitoring device is an original point, a progressing direction of the vehicle is a first coordinate axis and an axis orthogonal to the first coordinate axis is a second coordinate axis for transforming the positions of the objects into positions defined by the calculation coordinate system; a vehicle speed detecting device for detecting a vehicle speed of the vehicle; a stationary object sampling means for sampling a plurality of stationary objects among the objects based on the vehicle speed; and an error detecting device for detecting a deviation of an optical axis of the monitoring device based on the vehicle speed, components of the first coordinate axis of the plurality of stationary objects sampled by the stationary object sampling device and amounts of change in components of the second coordinate axis of the plurality of stationary objects in a predetermined period of time.

9 Claims, 4 Drawing Sheets

R-θ COORINATE SYSTEM

X-Y COORDINATE SYSTEM

H-V COORDINATE SYSTEM

VEHICLE SURROUNDING MONITORING DEVICE

BACKGROUND OF THE INVENTION

1. Field of the Invention

The present invention relates to a surrounding monitoring device of a vehicle having a monitoring means such as a laser radar, a camera or the like, particularly to detection of deviation in an optical axis of the surrounding monitoring device.

2. Discussion of Background

There is known a conventional device disclosed, for example, in Japanese Unexamined Patent Publication No. 225277/1995. In the device of the publication a surrounding monitoring device is accurately attached to a vehicle.

Even if attachment accuracy is improved by means disclosed in the publication since according to the conventional device the surrounding monitoring device is to be attached to a vehicle accurately by using attachment members, an error in attaching is inevitable.

Also, even if the surrounding monitoring device is accurately attached to the vehicle body, an optical axis of the surrounding monitoring device may not be in alignment with the progressing direction of the vehicle due to distortion of the vehicle body per se.

With regard thereto a simple explanation will be given in reference to FIG. 6. FIG. 6 is an explanatory view for explaining that the optical axis of the monitoring means is deviated by distortion of the vehicle body. In FIG. 6, numeral 100 designates the vehicle and numeral 101 designates tires the direction of which is not in alignment with the direction of the vehicle due to distortion of the vehicle body. Incidentally, FIG. 6 illustrates an example in which the vehicle body is extremely distorted to facilitate understanding. Numeral 102 designates a laser radar, numeral 103 designates the optical axis of the laser radar and numeral 104 designates the progressing direction of the vehicle.

As understood from FIG. 6, even if the laser radar is accurately attached to the vehicle 100, the optical axis 103 may not be in alignment with the progressing direction 104 as illustrated if the vehicle body is distorted.

Although, once the surrounding monitoring device is attached thereto, if the optical axis of the surrounding monitoring device is deviated by some cause, for example, loosening of attaching screws etc., the deviation can not be detected.

Further, if the optical axis of the surrounding monitoring device is deviated by some cause while the vehicle is running, the deviation can not be corrected in the midst of running.

SUMMARY OF THE INVENTION

The present invention has been carried out to resolve the above-mentioned problem and it is an object of the present invention to provide a vehicle surrounding monitoring device capable of detecting deviation of an optical axis of a monitoring means.

Further, it is another object of the present invention to promote reliability of a value of deviation in an optical axis by subjecting the value to a filter processing.

Further, it is another object of the present invention to further promote reliability of the value of deviation in an optical axis by weighting the value of deviation before the filter processing.

Still further, it is another object of the present invention to provide accurate positional information by correcting positional information of objects detected by a monitoring means in accordance with deviation in an optical axis.

Still further, it is another object of the present invention to provide a device capable of simply correcting positional information of objects.

Also, it is another object of the present invention to provide a device capable of correcting positional information of objects without complicating calculation process.

Also, it is another object of the present invention to promote reliability of a device by prohibiting detection of deviation in an optical axis under predetermined conditions.

Additionally, it is another object of the present invention to promote reliability of a device by continuing correction of positional information of objects even when detection of deviation in an optical axis is prohibited.

According to a first aspect of the present invention, there is provided a vehicle surrounding monitoring device comprising:

a monitoring means for detecting objects present at a surrounding of a vehicle and outputting positions of the objects defined by a predetermined detection coordinate system;

a coordinates transforming means having a calculation coordinate system in which a position of the monitoring means is an original point, a progressing direction of the vehicle is a first coordinate axis and an axis orthogonal to the first coordinate axis is a second coordinate axis for transforming the positions of the objects into positions defined by the calculation coordinate system;

a vehicle speed detecting means for detecting a vehicle speed of the vehicle;

a stationary object sampling means for sampling a plurality of stationary objects among the objects based on the vehicle speed; and an error detecting means for detecting a deviation of an optical axis of the monitoring means based on the vehicle speed, components of the first coordinate axis of the plurality of stationary objects sampled by the stationary object sampling means and amounts of change in components of the second coordinate axis of the plurality of stationary objects in a predetermined period of time.

According to a second aspect of the present invention, there is provided the vehicle surrounding monitoring device according to the first aspect, further comprising a filtering means for filtering the deviation detected by the error detecting means.

According to a third aspect of the present invention, there is provided the vehicle surrounding monitoring device according to the second aspect, wherein the filtering means weights the deviation before filtering the deviation such that the more the number of the sampled stationary objects, the more the amount of weighting is applied on a detected output of the error detecting means.

According to a fourth aspect of the present invention, there is provided the vehicle surrounding monitoring device according to the second aspect, wherein the filtering means weights the deviation before filtering the deviation such that the more the difference among the components of the first coordinate axis of the plurality of sampled stationary objects, the more the amount of weighting is applied on a detected output of the error detecting means.

According to a fifth aspect of the present invention, there is provided the vehicle surrounding monitoring device according to the first aspect, further comprising a correcting means for correcting positional information of the detected objects in accordance with the deviation of the optical axis.

According to a sixth aspect of the present invention, there is provided the vehicle surrounding monitoring device according to the fifth aspect, wherein the correcting means corrects the positional information of the detected objects by displacing the calculation coordinate system in accordance with the deviation of the optical axis.

According to a seventh aspect of the present invention, there is provided the vehicle surrounding monitoring device according to the fifth aspect, wherein the correcting means corrects the positional information of the detected objects by displacing the detection coordinate system in accordance with the deviation of the optical axis.

According to an eighth aspect of the present invention, there is provided the vehicle surrounding monitoring device according to the first aspect, further comprising a running radius estimating means for estimating a running radius of the vehicle and a calculation prohibiting means for prohibiting calculation of the error detecting means when the running radius of the vehicle is estimated to be a predetermined running radius or less.

According to a ninth aspect of the present invention, there is provided the vehicle surrounding monitoring device according to the eighth aspect, further comprising a correcting means for correcting positional information of the objects in accordance with the deviation of the optical axis and wherein the correcting means continues correcting operation even when the calculation of the error detecting means is prohibited.

DETAILED DESCRIPTION OF THE PREFERRED EMBODIMENTS EMBODIMENT 1

First, an explanation will be given of the way of thinking of Embodiment 1.

Figure 1A:
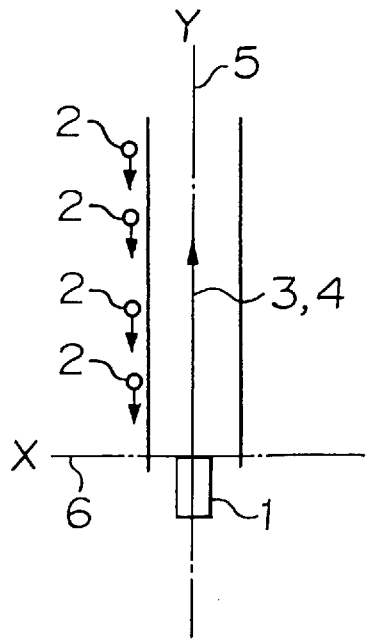
FIGS. 1(a), 1(b) and 1(c) are explanatory views showing relative movement of stationary objects detected by a laser radar.
Figure 1B:
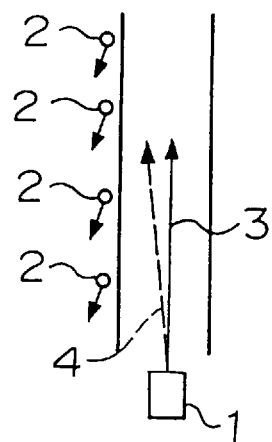
Figure 1C:
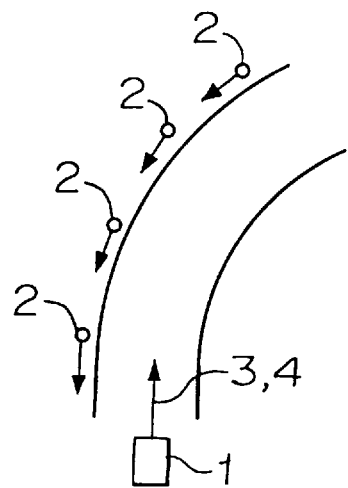

FIGS. 1(a), 1(b) and 1(c) are explanatory views showing relative movement of stationary objects detected by a laser radar in which FIG. 1(a) illustrates a case where a vehicle is running on a straight line road and an optical axis of the laser radar is in alignment with the progressing direction of the vehicle, FIG. 1(b) illustrates a case where the vehicle is running on the straight line road and the optical axis of the laser radar is not in agreement with the progressing direction of the vehicle and FIG. 1(c) illustrates a case where the vehicle is running on a curved road and the optical axis of the optical laser radar is in alignment with the progressing direction of the vehicle, respectively.

Incidentally, the progressing direction of the vehicle signifies a direction in which the vehicle is progressing at a time point and when the vehicle is, for example, cornering, the direction corresponds to a tangential direction of a circle drawn by a running radius of the vehicle.

In FIGS. 1(a), 1(b) and 1(c), numeral 1 designates the vehicle, numeral 2 designates a delineator as a stationary object installed along the road and an arrow mark attached to the delineator signifies an amount of relative movement of the delineator in a predetermined period of time. Numeral 3 designates the progressing direction of the vehicle 1 and numeral 4 designates the optical axis of the laser radar as a monitoring means. Numerals 5 and 6 designate coordinate axes defining a calculation coordinate system with the position of the laser radar as an original point in which notation Y indicated by a one-dotted chain line designates Y coordinate axis as a first coordinate axis that is set in the progressing direction of the vehicle and notation X indicated by a one-dotted chain line designates x coordinate axis as a second coordinate axis that is set in a direction orthogonal to Y coordinate axis.

First, it is assumed that the laser radar detects the delineators when the vehicle is running on the straight line road. If the optical axis of the laser radar is in alignment with the progressing direction of the vehicle 1, the delineator 2 becomes proximate toward the vehicle with the progress of the vehicle 1 but do not relatively move in the X axis direction in this case as shown by FIG. 1(a). By contrast, when the optical axis of the laser radar is deviated from the progressing direction of the vehicle 1, the delineator 2 becomes proximate to the vehicle with the progress of the vehicle and further, moves relatively in X axis direction in accordance with the direction in which the optical axis is deviated as illustrated in FIG. 1(b).

Therefore, it is possible to detect the deviation between the optical axis of the laser radar and the progressing direction by detecting the amount of change in X axis direction of the stationary objects in a predetermined period of time, that is, the velocity component in X axis direction in the case of the straight line road.

However, the relative movement of the stationary object in X axis direction is not caused only by the deviation of the optical axis. For example, if the road is curved as illustrated in FIG. 1(c), the stationary objects at forward positions relatively move in X axis direction with the progress of the vehicle 1. Accordingly, how much amount of the velocity component in X axis direction of the detected stationary object is caused by the curve and how much amount thereof is caused by the deviation of the optical axis must be identified.

In Embodiment 1, the both are distinguished from each other by paying attention to the fact that while the velocity component in X axis direction caused by the deviation of the optical axis stays the same regardless of the distance to the stationary object, with respect to the velocity component in X axis direction caused by the forward curve of road, the more remote the stationary object, the larger the velocity component whereas the more proximate the stationary object, the smaller the velocity component.

In other words, according to this invention the deviation of the optical axis is detected by detecting a plurality of stationary objects and based on the amounts of change in X axis direction of the stationary objects in a predetermined period of time and the distances thereto.

A detailed explanation will be given in reference to the drawings as follows.

Figure 2:
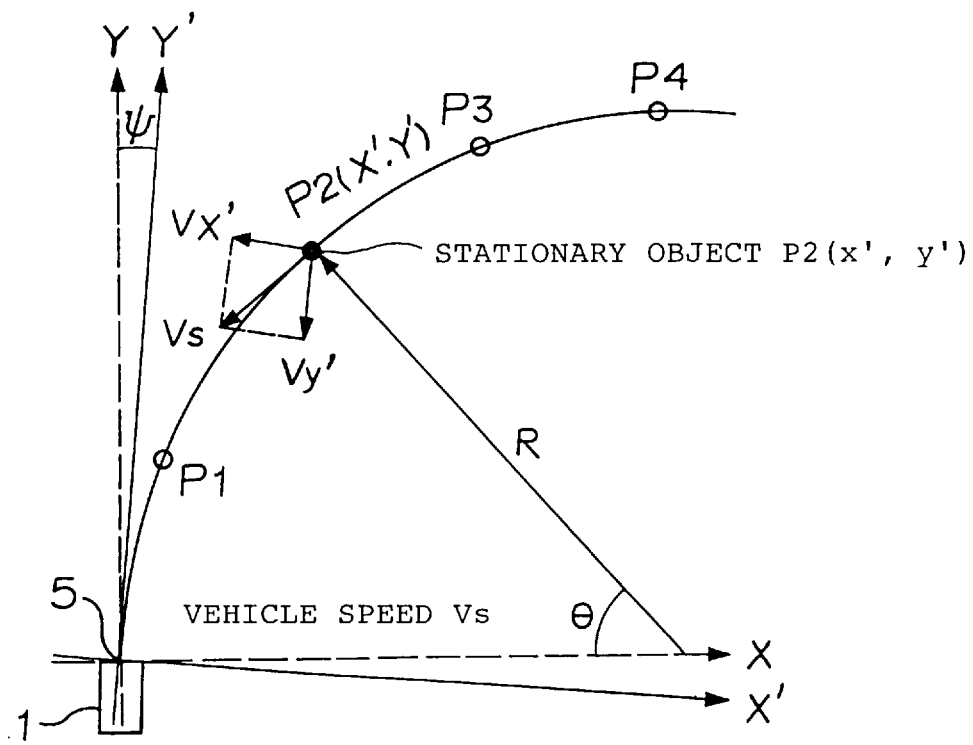
FIG. 2 is an explanatory view explaining technical thought of Embodiment 1.

FIG. 2 is an explanatory view explaining the technical thought of Embodiment 1 in which coordinate axes indicated by broken lines designate X-Y coordinate system in the case where the optical axis of the laser radar is in alignment with the progressing direction of the vehicle and coordinate axes indicated by bold lines designate X'-Y' coordinate system in the case where the optical axis of the laser radar is deviated to the right by an angle ψ.

In FIG. 2 notations P1 to notation P4 designate a plurality of stationary objects at the surrounding of the vehicle that are detected by the laser radar.

Here, an explanation will be given of the stationary object P2 as an example.

When the optical axis of the laser radar is inclined by ψ as illustrated, the X axis velocity component Vx' of the stationary object P2 in the inclined X'-Y' coordinate system is given by the following Equation (1).

$$Vx' = -Vs \cdot \sin(\theta - \psi) \quad (1)$$

Equation (1) can be approximated to the following Equation (2) if θ and ψ are assumed to be sufficiently small.

$$Vx' = -Vs \cdot (\theta - \psi) \quad (2)$$

θ can be represented by the following Equation (3) by using y' and R.

$$\theta = \frac{y'}{R} \quad \text{(where } y' << R\text{)} \quad (3)$$

Next, the X axis velocity component Vx' is represented by using Equation (2) and Equation (3) as follows.

$$Vx' = Vs \cdot \psi - Vs \cdot \frac{y'}{R} \quad (4)$$

Here, Equation (4) is written by substituting α for Vs and β for −Vs/R as follows to facilitate understanding.

$$Vx' = \alpha \cdot \psi + \beta \cdot y' \quad (5)$$

That is, ψ can be represented by a linear equation of Vx' and y'.

Figure 3:
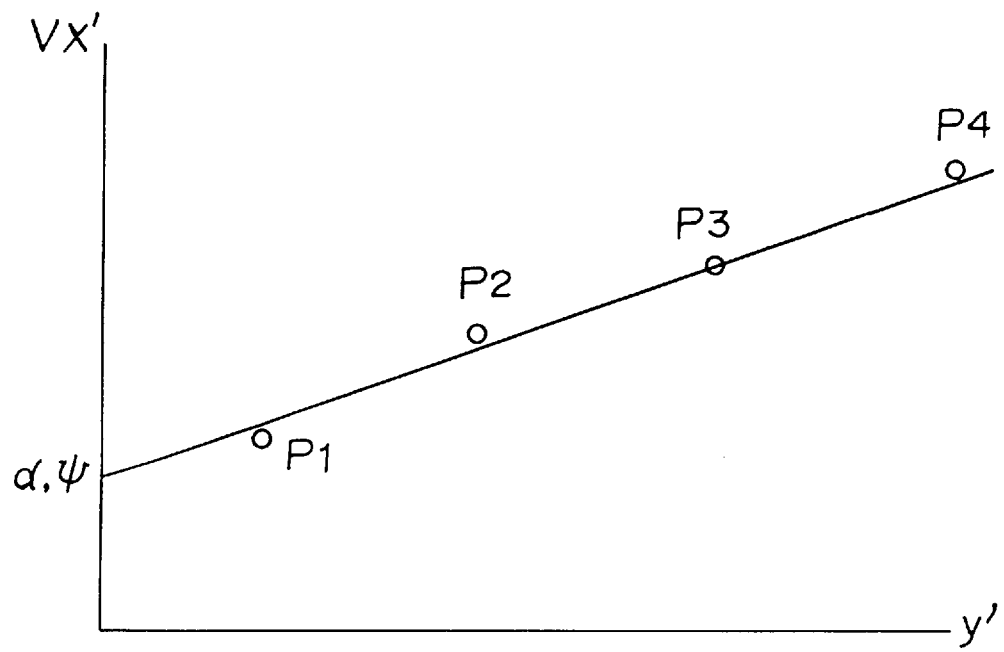
FIG. 3 is an explanatory view explaining a method of calculating deviation of an optical axis.

The linear equation is illustrated in FIG. 3. In Equation (5) α·ψ is an intercept of the linear equation which is the value of Vx' when y' is equal to 0.

Further, since α·ψ is the intercept, the graph as illustrated in FIG. 3 is translated to the upper direction of the drawing by a predetermined amount regardless of the size of y', which substantiates the fact that the velocity component in X axis direction caused by the above-mentioned deviation of the optical axis stays the same regardless of the distance to the stationary object.

Now, the X axis velocity component Vx' and the Y' axis component y' of the stationary object P2 can be detected by the laser radar. When the information is plotted in the y'–Vx' coordinate system of FIG. 3, the illustrated point of P2 can be plotted.

However, the graph of the linear equation can not be drawn and the intercept α·ψ can not be calculated only by plotting P2. It is necessary to plot two points at minimum to draw a graph of a linear equation.

Therefore, in Embodiment 1 the plurality of stationary objects P1 through P4 are detected.

Further, the intercept α·ψ is calculated by the method of least squares by using the information of the X' axis velocity components Vx' and the Y' axis components y' of the stationary objects P1 through P4 and the deviation ψ is detected by dividing the calculated α·ψ by α, that is, by the vehicle speed Vs. Incidentally, the vehicle speed Vs can easily be detected by a vehicle speed sensor.

Now, an explanation will be given to a device for reducing the above-mentioned technical thought to practice as follows.

Figure 4:
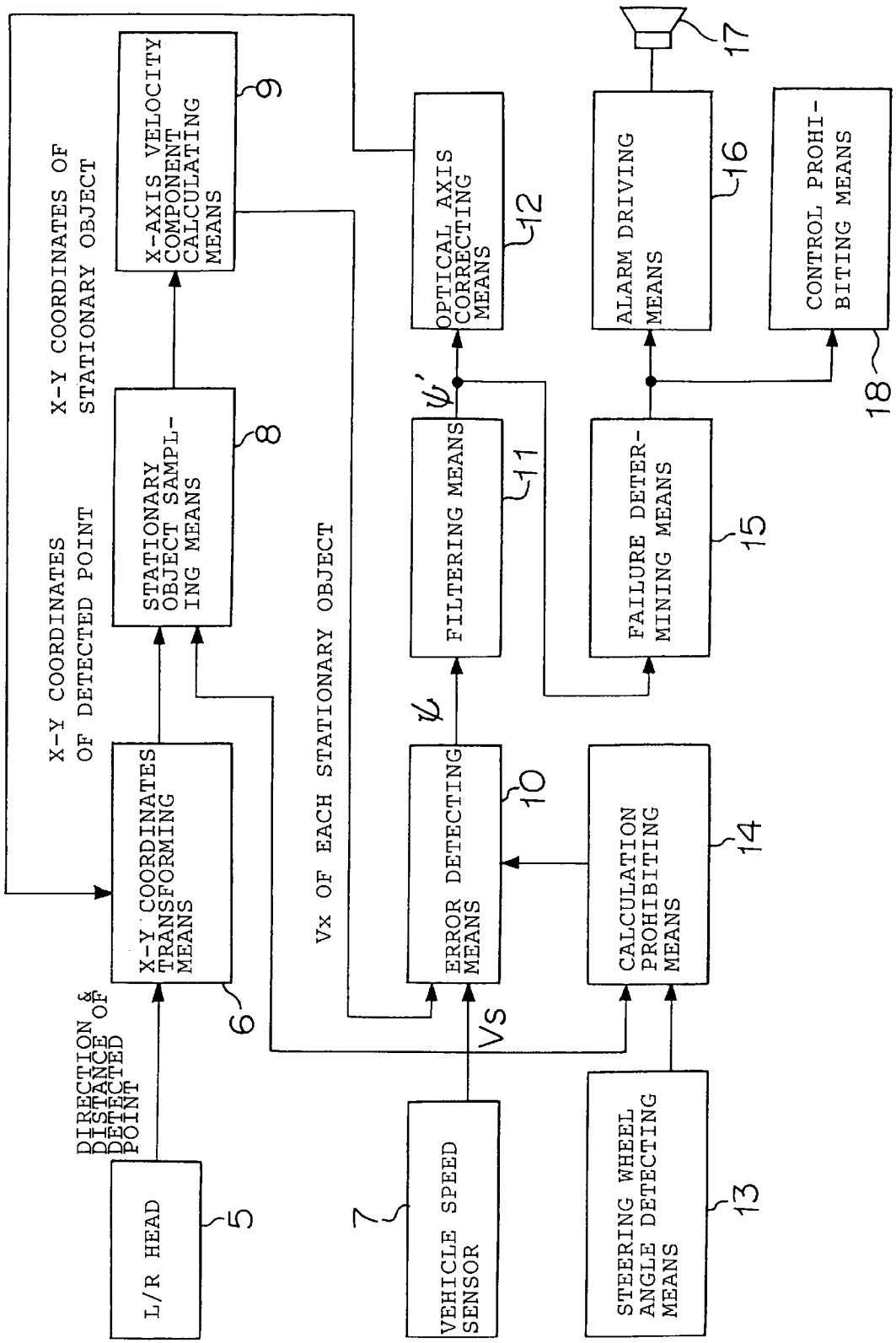
FIG. 4 is a block diagram showing the constitution of Embodiment 1.

FIG. 4 is a block diagram showing the constitution of Embodiment 1.

In FIG. 4 numeral 5 designates a laser radar as a monitoring means that is installed at a front face of the vehicle 1. Numeral 6 designates a X-Y coordinates transforming means as a coordinate transforming means for transforming positional information of a polar coordinate system detected by the laser radar into positional information for a calculation coordinate system comprising a X-Y coordinate system, numeral 7 designates a vehicle speed sensor as a vehicle speed detecting means for detecting a vehicle speed of the vehicle 1, numeral 8 designates a stationary object sampling means for sampling stationary objects among detected objects, numeral 9 designates a X-axis velocity component calculating means for calculating amounts of relative movement in X axis direction of the sampled stationary objects in a predetermined period of time, that is, X axis velocity components, numeral 10 designates an error detecting means for detecting a deviation ψ of an optical axis based on the vehicle speed signal Vs from the vehicle speed sensor 7, the Y' axis components of the plurality of stationary objects sampled by the stationary object sampling means 8 and the amounts of change of the X axis coordinate components of the plurality of stationary objects in a predetermined period of time that is calculated by the x axis velocity component calculating means 9, numeral 11 designates a filtering means for filtering the deviation ψ detected by the error detecting means 10, numeral 12 designates an optical axis correcting means as a correcting means for correcting the optical axis of the laser radar in accordance with the filtered deviation ψ', numeral 13 designates a steering wheel angle detecting means installed at a steering shaft and numeral 14 designates a calculation prohibiting means for prohibiting calculation of the error detecting means 10, which prohibits the calculation of the error detecting means when predetermined conditions are established by receiving the information of the vehicle speed signal Vs of the vehicle speed sensor 7 and the steering wheel angle from the steering wheel angle detecting means 13. Here, the vehicle speed sensor 7 or the steering wheel angle detecting means 13 constitutes a running radius estimating means. Numeral 15 designates a failure determining means for determining a failure of the device by determining whether the deviation ψ' that has been filtered by the filtering means 11 is equal to or larger than a predetermined threshold value, numeral 16 designates an alarm driving means for driving a speaker 17 by receiving a signal from the failure determining means 15 and numeral 18 designates a control prohibiting means for prohibiting controls which perform calculations by receiving the signal from the failure determining means 15 and by using the positional information from the laser radar 5.

Figure 5:
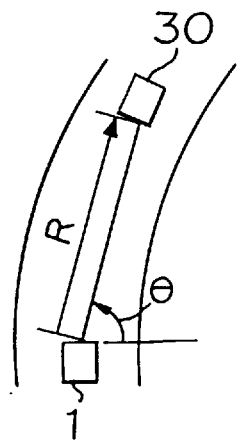
FIGS. 5(a), 5(b) and 5(c) are explanatory views for explaining coordinate systems.
Figure 5:
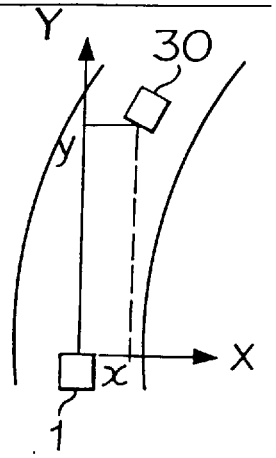
Figure 5:
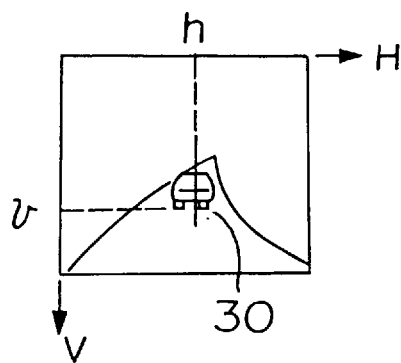
Figure 6:
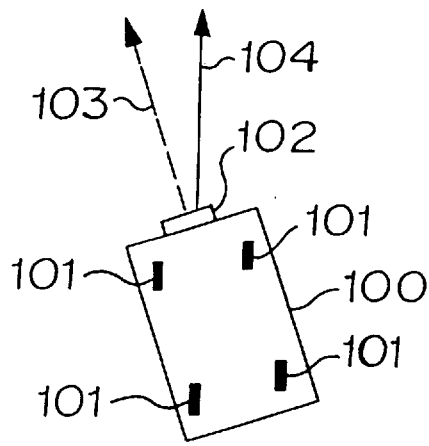
FIG. 6 is an explanatory view explaining that an optical axis of a monitoring means is deviated by distortion of a vehicle body.

First, the laser radar 5 detects objects present at the surrounding of the vehicle 1 by irradiating a search wave such as a near-infrared ray, an electromagnetic light or the like. The laser radar 5 is provided with a detection coordinate system of a polar coordinate system that is shown in FIG. 5(a). FIGS. 5(a), 5(b) and 5(c) are explanatory views for explaining coordinate systems. FIG. 5(a) indicates R-θ coordinate system that is the detection coordinate system of the laser radar 5, FIG. 5(b) indicates X-Y coordinate system that is the calculation coordinate system and FIG. 5(c) indicates H-V coordinate system that is a detection coordinate system of a CCD camera that is another monitoring means, respectively. Incidentally, a detailed explanation will be given later of the CCD camera.

As shown in FIG. 5(a) the positional information of an object detected by the laser radar 5, for example, a preceding vehicle 30 is indicated by a direction and a distance. This positional information is supplied to the X-Y coordinates transforming means 6. The X-Y coordinates transforming means 6 transforms the positional information in R-θ coordinate system detected by the laser radar 5 into the positional information of the calculation coordinate system comprising X-Y coordinate system as shown by FIG. 5(b). This calculation coordinate system is used in controlling the vehicle 1, for example, used in an inter-vehicle distance control for controlling constant an inter-vehicle distance to the preceding vehicle 30 etc. The positional information of the objects that is transformed into the positional information in X-Y coordinate system by the X-Y coordinates transforming means 6, is supplied to the stationary object sampling means 8 where only the stationary objects are sampled.

The stationary object sampling means 8 samples only stationary objects by paying attention to the fact that stationary objects relatively move at a speed equal to the vehicle speed of the vehicle 1. The positional information of the stationary objects on X-Y coordinate system is supplied to the X-axis velocity component calculating means 9. The X-axis velocity component calculating means 9 calculates an amount of relative movement in X-axis direction of each of the stantionary objects in a predetermined period of time, that is, the X-axis velocity component based on the positional information of each of the stationary objects sampled at previous time and the positional information of each of the stationary objects sampled at current time. This X-axis velocity component is supplied to the error detecting means 10.

The error detecting means 10 detects the deviation ψ of the optical axis based on the vehicle speed signal Vs from the vehicle speed sensor 7, Y'-axis components of a plurality of stationary objects sampled by the stationary object sampling means 8 and amounts of change Vx' of X'-axis coordinate components of the plurality of stationary objects in a predetermined period of time that are calculated by the X-axis velocity component calculating means 9.

That is, the Y'-axis component of the stationary object is given by the positional information (x', y') of the stationary object provided by the stationary object sampling means 8 and the X-axis velocity component Vx' is given by the X-axis velocity component calculating means 9. Plotting is conducted in FIG. 3 based on these data. The plotting is performed by a number of stationary objects sampled by the stationary object sampling means 8. Successively, the intercept α•ψ is calculated by using the method of least squares. Further, the deviation ψ is provided by dividing the calculated intercept α•ψ by the vehicle speed Vs (=α) obtained from the vehicle speed sensor 7.

Thus obtained deviation ψ is supplied to the filtering means 11 where filtering is conducted to promote the reliability of the value of the deviation ψ.

The filtering means is constituted by a timewise filter. There are primary filter, moving average filter, IIR filter, FIR filter and the like as filters for use. The filtered deviation ψ' is supplied to the optical axis correcting means 12. The optical axis correcting means 12 rotates the calculation coordinate system as shown by FIG. 2 in accordance with the filtered deviation ψ' by which the X'-Y' coordinate system is aligned with the X-Y coordinate system.

Also, the filtered deviation ψ' is supplied to the failure determining means 15. The failure determining means 15 determines the failure of device by determining whether the filtered deviation ψ' is equal to or larger than a predetermined threshold value. When the failure determining means 15 determines that the device is in failure, that is, in the case where the optical axis correcting means 12 can not correct the optical axis, the alarm driving means 16 drives the speaker 17 to issue an alarm sound. Also, the control prohibiting means 18 prohibits controls, for example, inter-vehicle distance control or the like upon receiving a signal from the failure determining means 15.

Further, in Embodiment 1, when predetermined conditions are established, the calculation of the deviation ψ by the error detecting means 10 is prohibited.

This operation is conducted to prohibit the calculation of the deviation ψ when the conditions set in developing the above-mentioned equations are not established in order to prevent the value of the deviation ψ from including error. The conditions specify that θ and ψ are sufficiently small and y'<<R. These conditions are not satisfied in running of the vehicle when the vehicle is cornering by a running radius of a predetermined value or less.

In Embodiment 1, the steering angle of the steering wheel is detected by using the steering wheel angle detecting means 13 and whether the vehicle 1 is cornering by a running radius of a predetermined value or less is detected.

Also, whether the running radius is provided with a predetermined value or less can be estimated by the vehicle speed. In other words, the speed by which a driver can run a vehicle fearlessly and safely in the midst of cornering, is determined by the running radius. Therefore, in Embodiment 1, when the vehicle is at high speed of a predetermined value or more, for example, when the vehicle speed is 60 km/hr or more, the running radius is determined to be a predetermined value or more. The vehicle speed of 60 km/hr or more is provided in awareness of a speedway.

The information of the steering wheel angle detected by the steering wheel angle detecting means 13 and the vehicle speed detected by the vehicle speed sensor 7 is given to the calculation prohibiting means 14. Then, the calculation prohibiting means 14 determines that the running radius of the vehicle is a predetermined value or less when the steering wheel is steered at a predetermined angle or more, or the vehicle speed is a predetermined value or less and prohibits the calculation of the error detecting means 10.

Incidentally, the calculation prohibiting means 14 prohibits only the calculation of the deviation ψ of the error detecting means 10 and does not prohibit the correcting operation by the optical axis correcting means 12.

Accordingly, even if the calculation of the deviation ψ is prohibited, the filtering operation by the filtering means 11 is continued based on the information which has been accumulated by that time and the X'-Y' coordinate system is corrected based on the deviation ψ' that has been filtered by that time.

Additionally, the condition that the calculation of the deviation ψ is prohibited when the vehicle speed is a predetermined value or less, has a significance that when the vehicle speed is low, the relative movement of the stationary object is small and the error included in the value of the deviation ψ is increased and accordingly, in such a case the calculation of the deviation ψ is prohibited.

According to the above-mentioned explanation the example of using a laser radar as a monitoring means has been shown, however, a CCD camera may be used in place of the laser radar.

In the case of a CCD camera, the detection coordinate system is H-V coordinate system as shown by FIG. 5(c). Accordingly, the function of the X-Y coordinates transforming means 6 may be altered such that the positional information of H-V coordinate system is transformed into the positional information of X'-Y' coordinate system.

Further, the filtering operation by the filtering means 11 in Embodiment 1 may be weighted.

In calculating the intercept in FIG. 3, the more the number of points of plotting, the more promoted is the calculation accuracy.

Therefore, the value of the deviation ψ is filtered after a weighting operation in which the more the number of stationary objects sampled by the stationary object sampling means 8, the more the value of the calculated deviation ψ is weighted.

The filtering operation here is conducted based on, for example, the following Equation (6).

$$\text{NewData} = \text{OldData} \cdot (1-k) + \text{NewData} \cdot K \quad (6)$$

In Equation (6) NewData designates a deviation ψ' that is calculated at current time and OldData designates a deviation ψ which has been filtered until the previous time and notation k designates a coefficient of weighting. The value of k is set such that the more the number of stationary objects, the more the value of k is weighted. For example, when the number of stationary objects is 2, k is 0.01, when the number of stationary objects is 3, k is 0.02 and when the number of stationary objects is 4, k is 0.03.

Also, the weighting may be performed such that the more a difference among Y'-axis components of a plurality of stationary objects, the more weighted is the detected deviation ψ.

For example, consider a case in FIG. 3 where the sampled stationary objects are only P2 and P3 and a case where they are only P1 and P4.

When intercepts are calculated in these two cases, a value of the intercept in the case where the difference between Y'-axis components of a plurality of stationary objects is large, that is, in the case where the sampled stationary objects are P1 and P4, is more reliable.

Accordingly, the reliability of the deviation ψ can be promoted by performing the weighting operation in consideration not only of the number of the stationary objects but also of the difference among the Y'-axis components of the stationary objects.

Further, the method of correcting the optical axis by rotating the calculation coordinate system by the optical axis correcting means 12 has been explained, however, the optical axis may be corrected by displacing the detection coordinate system.

That is, in the case of the laser radar, R-θ coordinate system may be displaced in accordance with the amount of the filtered deviation ψ' and in the case of the CCD camera, HV coordinate system may be displaced in accordance with the amount of the filtered deviation ψ'.

In this case it is not necessary to perform correction on the calculation coordinate system in which inter-vehicle distance control and the like are carried out and the positional information supplied from the monitoring means has already been corrected and accordingly, the processing such as the inter-vehicle distance control that is carried out on the calculation coordinate axis can be simplified.

Although in the above explanation the positional information of objects is summarizingly corrected by displacing the coordinate system, the positional information (X', Y') of an individual object may be corrected in accordance with the deviation.

Although the positional information of objects is summarizingly corrected by displacing the coordinate system in the above explanation, the direction of the monitoring means may be changed in accordance with the deviation by rendering the monitoring means such as the laser radar or the CCD camera drivable.

In this case, it is preferable to drive the monitoring means by using a step motor.

As mentioned above, according to Embodiment 1, the error in attaching the monitoring means such as the laser radar or the CCD camera is absorbed by which accurate correction of the optical axis can be conducted.

Even if the vehicle body per se is distorted, the optical axis of the monitoring means can be aligned with the progressing direction of the vehicle.

Even after attaching the monitoring means once, the optical axis can pertinently be corrected.

Even if the optical axis of the monitoring means is deviated by some cause in running the vehicle, the deviation can be corrected while the vehicle is running.

The reliability of value of the detected deviation can be promoted by filtering the detected deviation ψ.

The reliability of the value of the filtered deviation ψ' can be promoted since the filtering operation is weighted in accordance with the number of the stationary objects or the difference among the Y'-axis components of the stationary objects.

The reliability of the value of the detected deviation can be promoted since the calculation of the deviation ψ is prohibited when the predetermined conditions are not established.

The optical axis can be corrected accurately since the correcting operation of the optical axis is continued even if the calculation of the deviation ψ is prohibited.

Incidentally, the above-mentioned embodiments are examples for explaining the present invention and a variety of embodiments are naturally possible within the scope of the spirit of the present invention.

According to the vehicle surrounding monitoring device of the present invention, the deviation of the optical axis of the monitoring means can be detected based on the vehicle speed, the first coordinate components of a plurality of stationary objects and the amounts of change of the second coordinate components of the plurality of stationary objects in a predetermined period of time.

According to the vehicle surrounding monitoring device of the present invention, the reliability of the value of the deviation in the optical axis can be promoted by performing the filtering operation.

According to the vehicle surrounding monitoring device of the present invention, the reliability of the value of the deviation in the optical axis can further be promoted since the filtering operation is weighted in accordance with the number of sampled stationary objects.

According to the vehicle surrounding monitoring device of the present invention, the reliability of the value of the deviation in the optical axis can further be promoted since the filtering operation is weighted in accordance with the difference among the first coordinate components of the sampled stationary objects.

According to the vehicle surrounding monitoring device of the present invention, accurate positional information of objects can be provided since positional information of the objects detected by the monitoring means is corrected in accordance with the deviation in the optical axis.

According to the vehicle surrounding monitoring device of the present invention, positional information of objects can be corrected in a simplified manner since the calculation coordinate system is displaced in accordance with the deviation in the optical axis.

According to the vehicle surrounding monitoring device of the present invention, positional information of objects can be corrected without complicating the calculation processing since the detection coordinate system is displaced in accordance with the deviation in the optical axis.

According to the vehicle surrounding monitoring device of the present invention, the reliability of the device can further be promoted since the calculation of the deviation in the optical axis is prohibited when the running radius of the vehicle is predicted to be equal to or less than a predetermined running radius.

According to the vehicle surrounding monitoring device of the present invention, the reliability of the device can be promoted by continuing to correct the positional information of objects even when the detection of the deviation in the optical axis is prohibited.

What is claimed is:

1. A vehicle surrounding monitoring device comprising:
   a monitoring means for detecting objects present at a surrounding of a vehicle and outputting positions of the objects defined by a predetermined detection coordinate system;
   a coordinates transforming means having a calculation coordinate system in which a position of the monitoring means is an original point, a progressing direction of the vehicle is a first coordinate axis and an axis orthogonal to the first coordinate axis is a second coordinate axis for transforming the positions of the objects into positions defined by the calculation coordinate system;
   a vehicle speed detecting means for detecting a vehicle speed of the vehicle;
   a stationary object sampling means for sampling a plurality of stationary objects among the objects based on the vehicle speed; and
   an error detecting means for detecting a deviation of an optical axis of the monitoring means based on the vehicle speed, components of the first coordinate axis of the plurality of stationary objects sampled by the stationary object sampling means and amounts of change in components of the second coordinate axis of the plurality of stationary objects in a predetermined period of time.

2. The vehicle surrounding monitoring device according to claim 1, further comprising a filtering means for filtering the deviation detected by the error detecting means.

3. The vehicle surrounding monitoring device according to claim 2, wherein the filtering means weights the deviation before filtering the deviation such that the more the number of the sampled stationary objects, the more the amount of weighting is applied on a detected output of the error detecting means.

4. The vehicle surrounding monitoring device according to claim 2, wherein the filtering means weights the deviation before filtering the deviation such that the more the difference among the components of the first coordinate axis of the plurality of sampled stationary objects, the more the amount of weighting is applied on a detected output of the error detecting means.

5. The vehicle surrounding monitoring device according to claim 1, further comprising a correcting means for correcting positional information of the detected objects in accordance with the deviation of the optical axis.

6. The vehicle surrounding monitoring device according to claim 5, wherein the correcting means corrects the positional information of the detected objects by displacing the calculation coordinate system in accordance with the deviation of the optical axis.

7. The vehicle surrounding monitoring device according to claim 5, wherein the correcting means corrects the positional information of the detected objects by displacing the detection coordinate system in accordance with the deviation of the optical axis.

8. The vehicle surrounding monitoring device according to claim 1, further comprising a running radius estimating means for estimating a running radius of the vehicle and a calculation prohibiting means for prohibiting calculation of the error detecting means when the running radius of the vehicle is estimated to be a predetermined running radius or less.

9. The vehicle surrounding monitoring device according to claim 8, further comprising a correcting means for correcting positional information of the objects in accordance with the deviation of the optical axis and wherein the correcting means continues correcting operation even when the calculation of the error detecting means is prohibited.

* * * * *